United States Patent Office 3,024,109
Patented Mar. 6, 1962

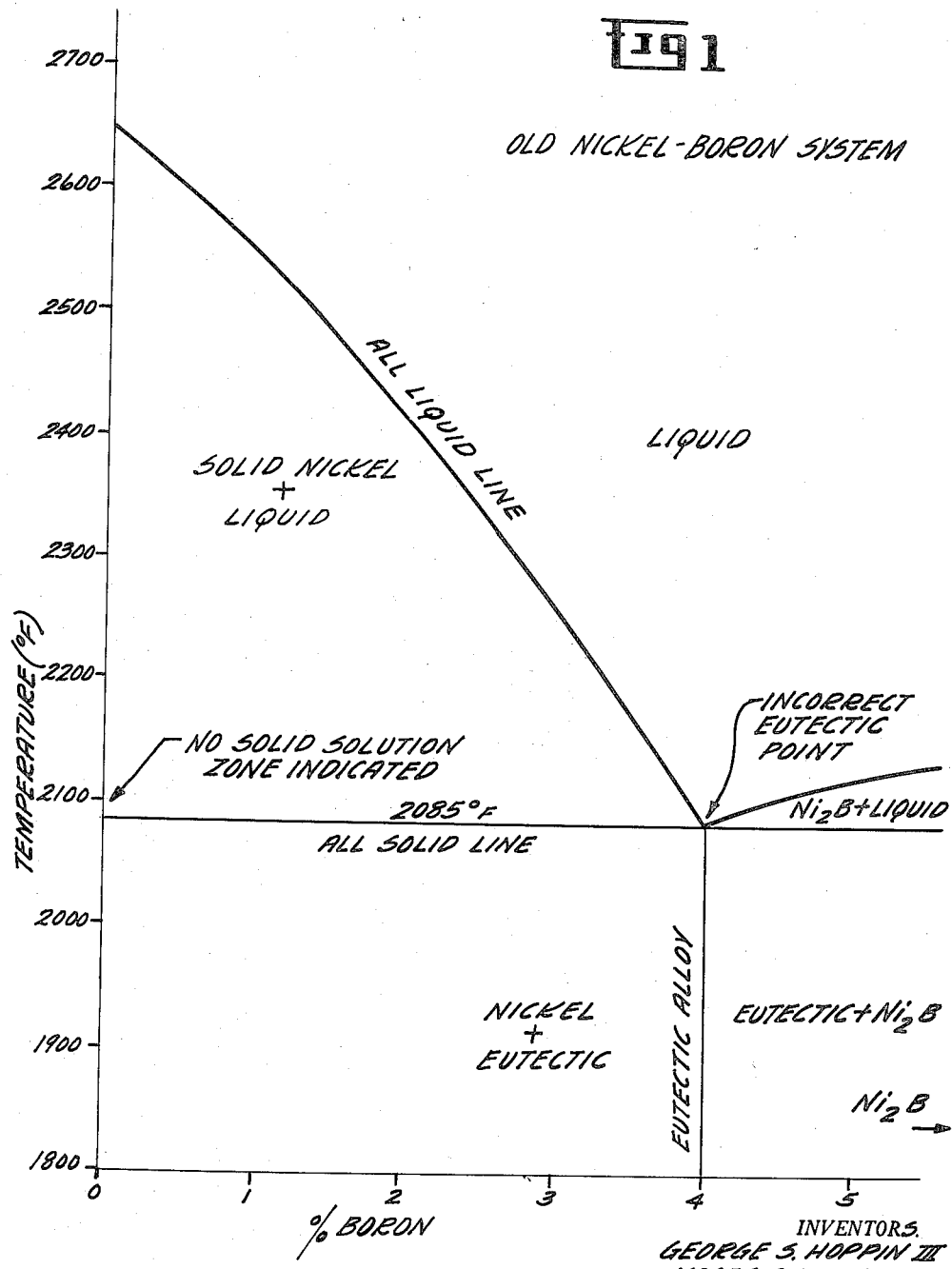

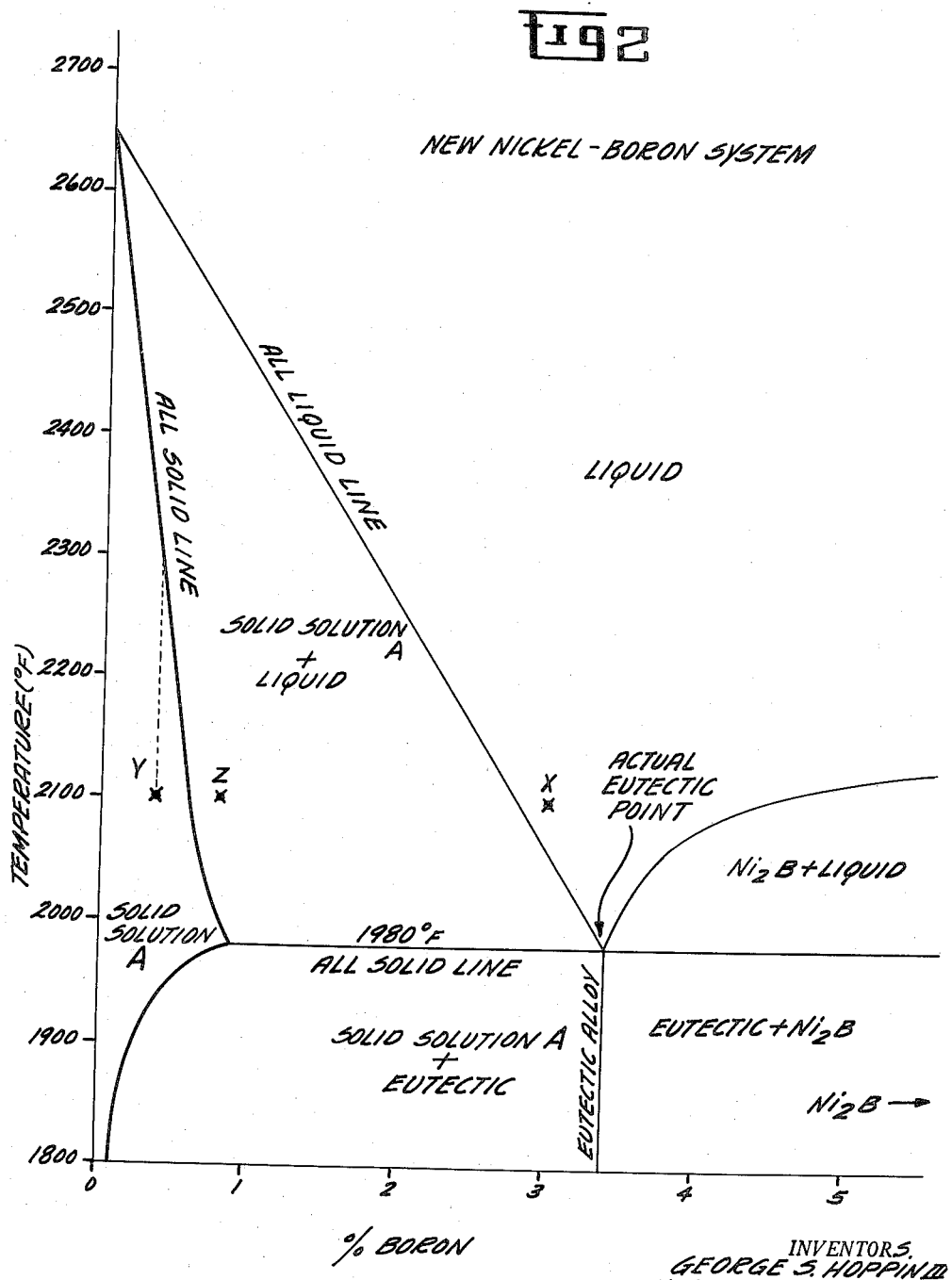

3,024,109
ELEVATED TEMPERATURE, NICKEL-BASE BRAZING ALLOYS
George Sidney Hoppin III, Hamilton, and Moses A. Levinstein, Cincinnati, Ohio, assignors to General Electric Company, a corporation of New York
Filed Dec. 24, 1957, Ser. No. 704,970
2 Claims. (Cl. 75—170)

This invention relates to elevated temperature brazing alloys and, more particularly to nickel-base brazing alloys of the nickel-silicon-boron type suitable for service up to about 2300° F.

During the past several years, nickel-base brazing alloys have been finding ever widening uses as oxidation resistant brazing materials. "Brazing" generally applies to the joining of members by a process in which a melted metal or alloy called a brazing metal or brazing alloy is positioned and solidified between members being joined. Melting may be brought about by means of a torch (torch brazing), in a furnace (furnace brazing), or by dipping into a molten bath (dip or flux brazing). The metal of the members does not melt as in welding. The "brazing temperature" is that temperature to which the brazing alloy is heated to cause flow or melting of the brazing alloy. Some desirable features in brazing alloys are (1) the melting temperature should be sufficiently lower than that of the members being joined to prevent melting and distortion of such members; (2) they should not contain constituents which will attack the members being joined, for example, to cause erosion or dissolution; (3) they should flow and wet adequately to fill the gap between the members being joined so as to create a smooth, continuous, nonporous joint; and (4) the melting temperature of the brazed joint should be higher than the original brazing temperature.

Diffusion, the basic mechanism through which the brazed joint's melting temperature is raised, is based in part on the following theory. A metal structure is made up of a group of grains having between them boundaries which may act as passageways for small atoms of other elements. Thus a metal piece may act as a selector, keeping larger atoms from entering its grain boundaries but allowing smaller atoms to pass in. Since boron is the smallest atom in a nickel-silicon-boron alloy system, it will pass more easily, by diffusion, into adjacent metal structures. Its removal raises the melting temperature of the depleted alloy which, after brazing, resides in the joint between two structures. The greater the depletion of boron, the greater is the increase of melting temperature of the brazed joint.

In order to deplete an alloy of boron so as to increase its melting temperature, it is best to start with an alloy system containing as little boron as practical. A large amount of data must be reviewed in order to determine the amount of each element which can be dissolved with other elements in planning a system such as a nickel-silicon-boron system. Such data relates to the melting of various alloys within that system and to the points of equilibrium between different compositions and phases of material. For convenience and ease of study, these data are frequently represented graphically by a phase diagram sometimes called an "equilibrium diagram." From this type of a drawing, which shows the physical condition of the various compositions of elements at different temperatures, one can predict the melting temperature of a specific alloy composition.

In studying such metallurgical data as were available, it was indicated that in cooling any molten nickel-boron alloy containing about 4% boron or less so as to create a brazing alloy containing as little boron as practical, we could only obtain a combination essentially of pure nickel grains and grains of an alloy containing about 4% boron, called a "eutectic" alloy. Consequently some known alloys which are completely molten at about 2000° F. and which are brazed at about 2000–2100° F. in a completely molten state have been described in the broad composition range in percent by weight of 0.75–5.25% boron, 2.5–5.5% silicon with the balance nickel.

Therefore the primary object of our invention is to provide an improved nickel-base, nickel-silicon-boron brazing material capable after brazing of remaining solid to a much higher temperature than any such former materials.

It is another object to provide a nickel base, nickel-silicon-boron alloy system including a minimum amount of boron to create an alloy that can readily be put into a solid solution condition by diffusion heat treatment.

Another object is to provide a brazing alloy which need not be completely melted in order to create a sound, ductile brazed joint stable to about 2300° F.

An additional object is to provide an improved method for brazing metal articles using a brazing alloy which starts to melt at about 1980° F.

Briefly stated, in accordance with one aspect of our invention, we have found that an improved nickel-base, nickel-silicon-boron alloy which starts to melt at about 1980° F. and which results in a sound, ductile bond suitable for operation up to about 2300° F. comprises in percent by weight about 0.5–1.8 boron, about 1.5–2.4 silicon with the balance essentially nickel.

In attempting to design new nickel-base brazing alloys of the nickel-silicon-boron type, we noted that available phase diagram data relating to that system was incorrect as to the nickel-boron phase relationship at various temperatures. We have discovered that a new solid phase exists in the low boron range of the nickel-boron equilibrium phase relationship. This new solid phase, called a "solid solution" was heretofore undiscovered.

The effect of this new solid solution zone on melting temperature of brazing alloys within our novel range can be seen by referring to the accompanying drawings:

FIGURE 1 is a graphical representation of the phase relationships at the low percent boron end of a nickel-boron system as previously reported in metallurgical literature.

FIGURE 2 is a graphical representation of the true phase relationships at the low percent boron range of a nickel-boron system as we have discovered them.

In FIGURE 1, no solid solution zone was recognized as existing in the low boron range of the nickel-boron system. On cooling any molten nickel-boron alloy containing about 4% boron or less to create a brazing alloy, it was believed that only combinations of nickel and an alloy containing about 4% boron, called a "eutectic alloy," could be obtained. In FIGURE 2, a diagram of the true phase relationship in a nickel-boron system, the solid solution zone which we have recognized is shown as Solid Solution A in the boron range of less than 1%. Although a range of boron content in brazing alloys has been reported as 0.75–5.25% boron, the unusual results we have obtained in the range 0.5–1.8% boron when used with silicon in the range of 1.5–2.4% has not been recognized heretofore. Commercially available nickel-base, nickel-silicon-boron type brazing alloys contain about 2–4% boron and about 3–5% silicon. On the nickel-boron phase diagram of FIGURE 2, such an alloy containing about 3% boron which starts to melt at about 1980° F. and is completely molten at about 2050° F., might be represented at 2100° F. by point X. In order to increase the melting temperature of the alloy from about 2000° F. to about 2300° F., it would be necessary to deplete the alloy of about 2.6% of its boron content as represented by the distance between point X and point Y in FIG- URE 2. The time necessary for such diffusion to take place, even at temperatures much higher than 2100° F., would be extremely long and impractical for any commercial process. It is to be noted that point Y and other points within the Solid Solution A previously were not recognized as existing prior to our discovery. It was formerly believed that to get a phase which was solid above about 2085° F. it was necessary to deplete the alloy of all of its boron content leaving solid nickel, which melts in excess of 2600° F. We have found that an alloy containing up to about 1.8% boron can easily be depleted of enough boron to raise its melting point several hundred degrees. For example, in FIGURE 2 if we represent our preferred alloy containing about 0.8% boron as point Z at 2100° F., we need only diffuse away about 0.4% boron, represented by the distance between points Z and points Y, in order to raise the melting point of our alloy from about 2000° F. to about 2300° F. The diffusion of a few tenths percent boron takes considerably less time than does diffusion of several percent.

Another novel feature of our alloy is that during brazing it is not completely molten but is "slushy" up to about 2300° F. The brazing of other commercially available alloys is conducted entirely in the molten phase. In addition, due to its low content of silicon and boron (the major erosion producing elements in brazing alloys), our alloy shows very low erosive characteristics during brazing.

Our invention will be better understood from our description and the succeeding examples which are given by way of illustration only and not in any sense by way of limitation. The scope of our invention will be pointed out in the appended claims.

*Example 1*

Although we have discussed our improved nickel-base, nickel-silicon-boron alloy in the broadest range in which we have found it to be useful (namely, in percent by weight about 0.5–1.8 boron, about 1.5–2.4 silicon and the balance essentially nickel), our specifically preferred range of elements comprises in percent by weight about 0.6–0.9 boron, 1.8–2.2 silicon, with the balance essentially nickel. An alloy of this specific range was melted and made into a powder of about 200 mesh size. We then formed a putty-like paste by mixing that powder with a small amount of a binder of the acrylic resin type dissolved in toluene. This paste was used to produce a brazed joint through a conventional brazing operation such as the following:

We placed this putty-like material in a gap between two metallic members to be joined so that the entire gap was filled and a fillet remained above the gap. Although our alloy may be used to join any elevated temperature materials, in this example we used material of the composition in percent by weight of about 20% chromium, about 1% silicon, about 0.05% carbon, with the balance essentially nickel.

After we placed the putty-like material as above, we applied a standard commercial brazing "stop-off" compound to the metal surfaces adjoining the area to be brazed. This inhibited the brazing alloy from spreading over the surface of the members during the brazing operation. We placed the members thus prepared in a furnace, the air atmosphere of which we then displaced with a dry hydrogen atmosphere. The temperature of the furnace was raised to about 1980° F. where it was noted that melting of the brazing alloy began. The temperature was then raised to 2250° F. at which temperature we held the part for a time sufficient to allow the brazing alloy to flow into place. After brazing at about 2250° F. the resulting bond was both strong and ductile. The brazed joint had an even surface showing sufficient flow and an absence of lumps. After brazing we found that the diffusion of boron from the brazing alloy into the metals being joined created a joint which was completely resistant to melting up to about 2300° F. However in brazing structures using a relatively large amount of brazing alloy it may be necessary either to maintain the brazing temperature for a longer than ordinary period of time or, after brazing to diffusion heat treat the brazed joint at about 2200° F. Such additional procedures allow diffusion of the boron from the brazing alloy into the metals being joined thereby creating a joint completely resistant to melting up to about 2300° F.

*Example 2*

A specific composition which we have found most useful within our effective range is the nickel base alloy comprising in percent by weight about 0.8% boron, about 2.0% silicon with the balance essentially nickel. A melt of this alloy was powdered to about 200 mesh size and the procedure of Example 1 above was followed. The same smooth, ductile, strong, adherent brazed joint as that of Example 1 was obtained from this composition.

One of the most unconventional properties of our alloy as a brazing material is that the fusing and brazing of the alloy is performed within the temperature range where both solid and liquid phases exist in equilibrium. Our alloy need not be heated to a temperature at which it would be all liquid. Brazing with conventional alloys is performed above the temperature at which all of the alloy is liquid. For example, during brazing our alloy will start melting at about 1980° F. and is not completely molten at about 2300° F. Therefore, fusing and brazing of our alloy can be performed at about 2000–2250° F. depending upon the precise composition. One of the difficulties in using commercially available elevated temperature alloys is that excessive flow during fusing occurs resulting in an uneven, lumpy surface. However our alloy does not become lumpy during fusing since only a small portion of it is liquid and a limited flow occurs.

In the foregoing description we have disclosed an improved nickel-base, nickel-silicon-boron type brazing alloy. Although we have described our invention in connection with specific examples, these examples are to be construed as illustrative rather than limitations on our broad idea of forming a low boron brazing alloy near the newly recognized solid solution phase. Those skilled in the art of brazing will readily understand the modifications and variations of which our invention is capable, for example, as to the variation of sizes of powder made from our alloy, the time and temperature cycles of brazing, the brazing atmospheres involved, the types and thickness of metals being joined, and the methods of application of the brazing alloy to the joint to be brazed. We intend in the appended claims to cover modifications and variations that come within the true spirit and scope of our invention.

What we claim is new and desire to secure by Letters Patent of the United States is:

1. An improved nickel-base brazing alloy suitable for elevated temperature use consisting of in percent by weight: about 0.6–0.9 boron; about 1.8–2.2 silicon; balance essentially nickel and impurities.

2. An improved nickel-base brazing alloy suitable for elevated temperature use consisting of in percent by weight: about 0.8 boron; about 2.0 silicon; balance essentially nickel and impurities.

References Cited in the file of this patent

UNITED STATES PATENTS

| | | |
|---|---|---|
| 2,714,760 | Boam et al. | Aug. 9, 1955 |
| 2,743,177 | Cape | Apr. 24, 1956 |
| 2,844,867 | Wernz et al. | July 29, 1958 |
| 2,880,086 | Cape | Mar. 31, 1959 |
| 2,899,302 | Cape et al. | Aug. 11, 1959 |